(12) United States Patent
Kierzyk et al.

(10) Patent No.: US 12,549,444 B2
(45) Date of Patent: Feb. 10, 2026

(54) MANAGEMENT OF APPLICATION PROGRAMMING INTERFACES FOR MICROSERVICES OF NETWORK FUNCTIONS

(71) Applicant: DISH Wireless L.L.C., Englewood, CO (US)

(72) Inventors: Bob Kierzyk, Littleton, CO (US); Media Johnsen, Denver, CO (US); Edwin Abboud, Denver, CO (US); Ahmed Alkarboly, Denver, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 250 days.

(21) Appl. No.: 18/455,497

(22) Filed: Aug. 24, 2023

(65) Prior Publication Data
US 2025/0071022 A1 Feb. 27, 2025

(51) Int. Cl.
*H04L 41/0894* (2022.01)
*G06F 9/54* (2006.01)
*H04L 41/5009* (2022.01)

(52) U.S. Cl.
CPC .......... *H04L 41/0894* (2022.05); *G06F 9/547* (2013.01); *H04L 41/5009* (2013.01)

(58) Field of Classification Search
CPC .. G06F 9/547; H04L 41/0894; H04L 41/5009
See application file for complete search history.

(56) References Cited

U.S. PATENT DOCUMENTS

| | | | |
|---|---|---|---|
| 2021/0240540 A1* | 8/2021 | Wang | G06F 9/45558 |
| 2022/0224535 A1* | 7/2022 | Coffing | H04L 63/205 |
| 2024/0303094 A1* | 9/2024 | Premkrishna | G06F 21/44 |
| 2024/0385915 A1* | 11/2024 | Chilakamarri | G06F 9/541 |

* cited by examiner

*Primary Examiner* — Gil H. Lee
(74) *Attorney, Agent, or Firm* — Seed Intellectual Property Law Group LLP

(57) ABSTRACT

Technologies for facilitating APIs for microservices associated with a communications network are disclosed. An example method includes receiving a request to a target API exposed by an API platform, and invoking a combination of API governance modules corresponding to the target API and selected from API governance modules implemented remotely from the API platform, to map the request to microservices. The microservices include internal microservice(s) maintained within the communications network and external microservice(s) maintained externally to the communications network. The method also includes applying API governance policies indicated by the combination of API governance modules to validate interactions with the external microservice(s) based on the request and generating and sending a response to the request.

20 Claims, 4 Drawing Sheets

MANAGEMENT OF APPLICATION PROGRAMMING INTERFACES FOR MICROSERVICES OF NETWORK FUNCTIONS

BACKGROUND

In telecommunications, 5G is the fifth-generation technology standard for broadband cellular networks. 5G networks are cellular networks, in which the service area is divided into small geographical areas called cells. 5G wireless devices in a cell can communicate by radio waves with a cellular base station (e.g., located on a cellular tower) via fixed antennas, over frequency channels. The base stations can be connected to switching centers in the telephone network and routers for Internet access by high-bandwidth optical fiber or wireless backhaul connections. There is a need for technologies that facilitate efficient integration of internal and external microservices of network functions into 5G networks.

BRIEF SUMMARY

A communication service provider (e.g., a 5G network wireless service provider) may work with partners (e.g., independent software vendors (ISVs), device vendors, roaming partners, or other third parties) to develop and implement various communications network functions, and rollout network features and services. Individual network functions, features, or services may be implemented in a single or combination of microservices (e.g., containerized network functions), which can be developed and maintained internally by the communication service provider or externally by third party partner(s). This disclosure provides a framework and methodology to enable configurable, efficient, and transparent integration of internal and external microservices into a communications network via application programming interfaces (APIs).

In some implementations of a communications network (e.g., a 5G network), the entirety or at least some network functions, components, or elements of the network core (e.g., 5G core) can be implemented logically or virtually, via one or more cloud service providers. The network core communicates with various cell sites that are located in different geographic or network locations, subjecting to control of same or different entities. The communication service provider's partners can develop external microservices for network functions or services in accordance with the cloud implementation of network core.

In some embodiments, a computer-implemented method for facilitating APIs to microservices associated with a 5G communications network includes receiving, at an API platform, a request to a target API of a plurality of APIs exposed by the API platform, and invoking, by the API platform, a combination of API governance modules corresponding to the target API and selected from a plurality of API governance modules implemented remotely from the API platform, to map the request to a plurality of microservices, wherein the plurality of microservices includes one or more internal microservices maintained within the 5G communications network and one or more external microservices maintained externally to the 5G communications network. The method also includes applying, by the API platform, API governance policies indicated by at least a subset of the combination of API governance modules to validate interactions with the one or more external microservices based, at least in part, on the request, and generating and sending a response to the request based, at least in part, on the interactions with the one or more external microservices.

In some embodiments, the request to the target API is sent from a requesting device and the invoking of the combination of API governance modules is transparent to the requesting device. In some embodiments, invoking the combination of API governance modules to map the request to the plurality of microservices comprises mapping the request, at least in part, to a subset of the plurality of microservices in a temporally sequential manner. In some embodiments, invoking the combination of API governance modules to map the request to the plurality of microservices comprises mapping the request, at least in part, to a subset of the plurality of microservices in a temporally concurrent manner.

In some embodiments, invoking the combination of API governance modules to map the request to the plurality of microservices comprises mapping the request, at least in part, to a subset of the plurality of microservices in a logically recursive manner. In some embodiments, mapping the request, at least in part, to a subset of the plurality of microservices in a logically recursive manner includes receiving, at the API platform and from a microservice of the subset, another request to another target API of the plurality of APIs exposed by the API platform; invoking, by the API platform, another combination of API governance modules corresponding to the other target API and selected from the plurality of API governance modules implemented remotely from the API platform, to map the other request to one or more microservices of the subset; and generating and sending a response to the other request based, at least in part, on interactions with the one or more microservices of the subset.

In some embodiments, applying the API governance policies indicated by at least a subset of the combination of API governance modules to validate interactions with the one or more external microservices comprises validating at least one of data quality, data registration, response time, or version of the one or more external microservices. In some embodiments, the at least one data quality, data registration, response time, or version of the one or more external microservices is specified by a service level agreement.

In some embodiments, an API facilitation system for a communications network includes memory that stores computer executable instructions and one or more processors that individually or collectively execute the computer executable instructions to cause actions to be performed. The actions include receiving, at an API platform, a request to a target API of a plurality of APIs exposed by the API platform, and invoking, by the API platform, a combination of API governance modules corresponding to the target API and selected from a plurality of API governance modules implemented remotely from the API platform, to map the request to a plurality of microservices, wherein the plurality of microservices includes one or more internal microservices maintained within the communications network and one or more external microservices maintained externally to the communications network. The actions also include applying, by the API platform, API governance policies indicated by at least a subset of the combination of API governance modules to validate interactions with the one or more external microservices based, at least in part, on the request, and generating and sending a response to the request based, at least in part, on the interactions with the one or more external microservices.

In some embodiments, the request to the target API is sent from a requesting device and the applying of the API governance policies is transparent to the requesting device. In some embodiments, invoking the combination of API governance modules to map the request to the plurality of microservices comprises mapping the request, at least in part, to a subset of the plurality of microservices in at least one of a temporally sequential manner, temporally concurrent manner, or temporally partially overlapping manner.

In some embodiments, invoking the combination of API governance modules to map the request to the plurality of microservices comprises mapping the request, at least in part, to a subset of the plurality of microservices in a logically recursive manner. In some embodiments, mapping the request, at least in part, to a subset of the plurality of microservices in a logically recursive manner includes: receiving, at the API platform and from a microservice of the subset, another request to another target API of the plurality of APIs exposed by the API platform; invoking, by the API platform, at least one other API governance module corresponding to the other target API and selected from the plurality of API governance modules implemented remotely from the API platform, to map the other request, at least in part, to one or more microservices of the subset; and generating and sending a response to the other request based, at least in part, on interactions with the one or more microservices of the subset.

In some embodiments, the interactions with at least one of the one or more external microservices comprises retrieving intermediate data from the at least one of the one or more external microservices, wherein the intermediate data is at least a portion of input into at least one of the one or more internal microservices. In some embodiments, applying the API governance policies indicated by at least a subset of the combination of API governance modules to validate interactions with the one or more external microservices comprises validating at least one of data quality, data registration, response time, or version of the one or more external microservices.

In some embodiments, one or more non-transitory computer-readable media collectively stores contents that, when executed by one or more processors, cause the one or more processors, individually or collectively, to perform actions. The actions include receiving, at an API platform, a request to a target API of a plurality of APIs exposed by the API platform, and invoking, by the API platform, a combination of API governance modules corresponding to the target API and selected from a plurality of API governance modules implemented remotely from the API platform, to map the request to a plurality of microservices, wherein the plurality of microservices includes one or more internal microservices maintained within the communications network and one or more external microservices maintained externally to the communications network. The actions also include applying, by the API platform, API governance policies indicated by at least a subset of the combination of API governance modules to validate interactions with the one or more external microservices based, at least in part, on the request, and generating and sending a response to the request based, at least in part, on the interactions with the one or more external microservices.

In some embodiments, invoking the combination of API governance modules to map the request to the plurality of microservices comprises mapping the request, at least in part, to a subset of the plurality of microservices in at least one of a temporally sequential manner, temporally concurrent manner, or temporally partially overlapping manner.

In some embodiments, the one or more non-transitory computer-readable media of claim 15, wherein invoking the combination of API governance modules to map the request to the plurality of microservices comprises mapping the request, at least in part, to a subset of the plurality of microservices in a logically recursive manner. In some embodiments, mapping the request, at least in part, to a subset of the plurality of microservices in a logically recursive manner includes: receiving, at the API platform and from a microservice of the subset, another request to another target API of the plurality of APIs exposed by the API platform; invoking, by the API platform, at least one other API governance module corresponding to the other target API and selected from the plurality of API governance modules implemented remotely from the API platform, to map the other request, at least in part, to one or more microservices of the subset; and generating and sending a response to the other request based, at least in part, on interactions with the one or more microservices of the subset.

In some embodiments, the interactions with at least one of the one or more external microservices comprises retrieving intermediate data from the at least one of the one or more external microservices, wherein the intermediate data is at least a portion of input into at least one of the one or more internal microservices. In some embodiments, applying the API governance policies indicated by at least a subset of the combination of API governance modules to validate interactions with the one or more external microservices comprises validating at least one of data quality, data registration, response time, or version of the one or more external microservices.

Figure 1:
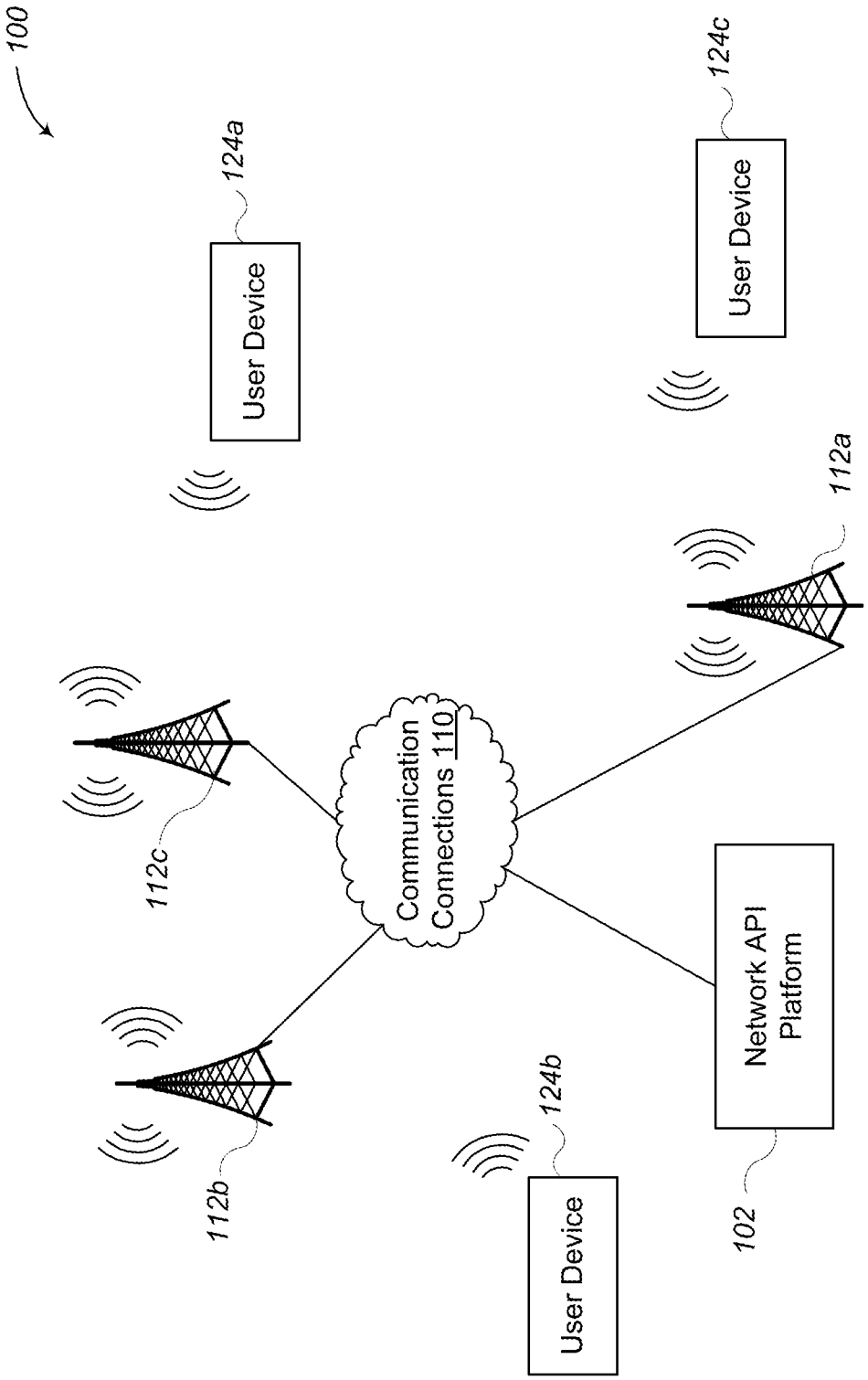
FIG. 1 is a block diagram illustrating an example networked environment to facilitate API management for integration of microservices into a communications network in accordance with some embodiments of the techniques described herein.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for case of recognition in the drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

FIG. 1 is a block diagram illustrating an example networked environment 100 to facilitate API management for integration of microservices into a communications network in accordance with some embodiments of the techniques described herein. Environment 100 includes a plurality of cells 112a-112c, a plurality of user devices 124a-124b, a network API platform 102, and communication connections 110. Illustratively, the cells 112a-112c correspond to cell sites (e.g., cellular towers) that together implement a 5G cellular communications network. The cells 112a-112c may include or be in communication with base stations, radio back haul equipment, antennas, or other devices, which are not illustrated for ease of discussion.

Although embodiments are directed to 5G cellular communications, embodiments are not so limited and other types of cellular communications technology may also be utilized or implemented. In various embodiments, the cells 112a-112c may communicate with each other via communication connections 110. Communication connections 110 include one or more wired or wireless networks, which may include a series of smaller or private connected networks that carry information between the cells 112a-112c.

The user devices 124a-124c are computing devices that receive and transmit cellular communication messages or other data with the cells 112a-112c, e.g., via antennas or other means. Examples of user devices 124a-124c may include, but are not limited to, mobile devices, smartphones, tablets, cellular-enabled laptop computers, or other user equipment (UE) or computing devices that can communicate with one or more wireless communications networks including a 5G cellular network.

In various embodiments, the network API platform 102 can include one or more computing devices to perform the management of API and microservices, as well as other related functions described herein. In some embodiments, the network API platform 102 interfaces or otherwise communicates with one or more elements of the 5G network core via the communication connections 110. The 5G network core or at least some functions, components, or elements thereof can be implemented, virtually or logically, via cloud computing services provided by one or more cloud service providers. The interface between the network API platform 102 and the core element(s) may be direct or may leverage an external API or other gateway. In some embodiments, the network API platform 102 can interface or otherwise communicate with cell sites (e.g., cellular towers or controllers thereof), or with systems or devices external to the 5G network (e.g., systems or devices implementing external microservices). In some embodiments, the network API platform 102 is partly or entirely implemented inside or outside the 5G network core.

The above description of the exemplary networked environment 100 and the various services, systems, networks, and devices therein is intended as a broad, non-limiting overview of an example environment in which various embodiments of the presently disclosed technologies may be implemented. FIG. 1 illustrates just one example of an operating environment, and the various embodiments discussed herein are not limited to such an environment. In particular, the networked environment 100 may contain other devices, systems, or media not specifically described herein.

Figure 2:
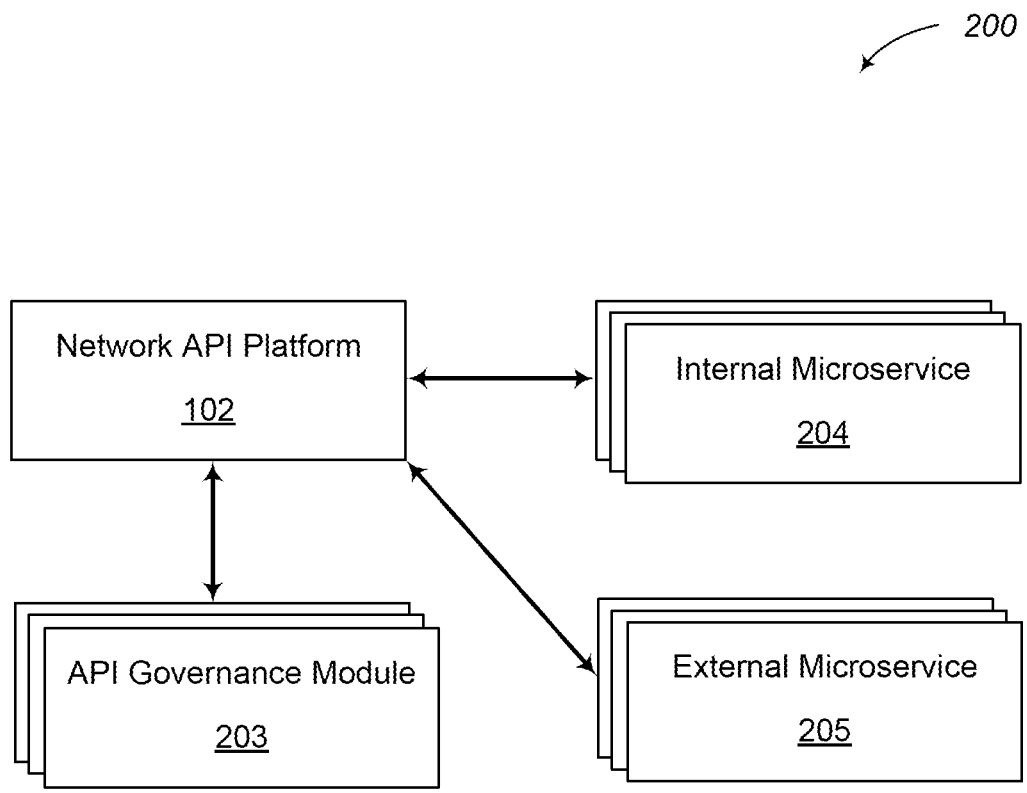
FIG. 2 illustrates an example framework of interactions between a network API platform and related entities, in accordance with some embodiments of the techniques described herein.

FIG. 2 illustrates an example framework 200 of interactions between the network API platform 102 and related entities, in accordance with some embodiments of the techniques described herein. As illustrated, the network API platform 102 is implemented separately (e.g., in physical or virtual form) from API governance module(s) 203, internal microservice(s) 204, and external microservice(s) 205. The network API platform 102 exposes various APIs to API users (e.g., user devices, network functions, microservices, or other computing systems or devices) through API end points (e.g., physical or virtual servers) implemented thereon, allowing various functions to be accessible to the API user via a combination of internal and/or external microservices. An API user can interact (e.g., by making API calls and receiving responses) with the network API platform 102 but may not have direct access to the API governance module(s) 203, internal microservice(s) 204, or external microservice(s) 205. In other words, the implementation or functions of the API governance module(s) 203, internal microservice(s) 204, and/or external microservice(s) 205 may be transparent to the API user.

The one or more API governance modules 203 can include API governance policies, which may be developed at the time when external microservice(s) are onboarded for integration into the communications network. The API governance module(s) 203 and/or corresponding governance policies may be modified or updated in accordance with further development of the communications network or relevant external microservice(s). An API governance module may correspond to the governance of one or multiple external microservices, and an external microservice may be subject to the governance of a single or multiple API governance modules. The governance is performed by the network API platform 102, which has access to the API governance module(s) 203, internal microservice(s) 204, and external microservice(s) 205; whereas no communication or interaction may exist between the API governance module(s) 203 and external microservice(s) 205. The internal microservice(s) 204 can be developed and maintained by the communications service provider of the communications network; the internal microservice(s) 204 may or may not be subject to governance of API governance module(s) 203. In some embodiments, no communication or interaction may exist between the internal microservice(s) 204 and the API governance module(s) 203, or between the internal microservice(s) 204 and external microservice(s) 205.

Figure 3:
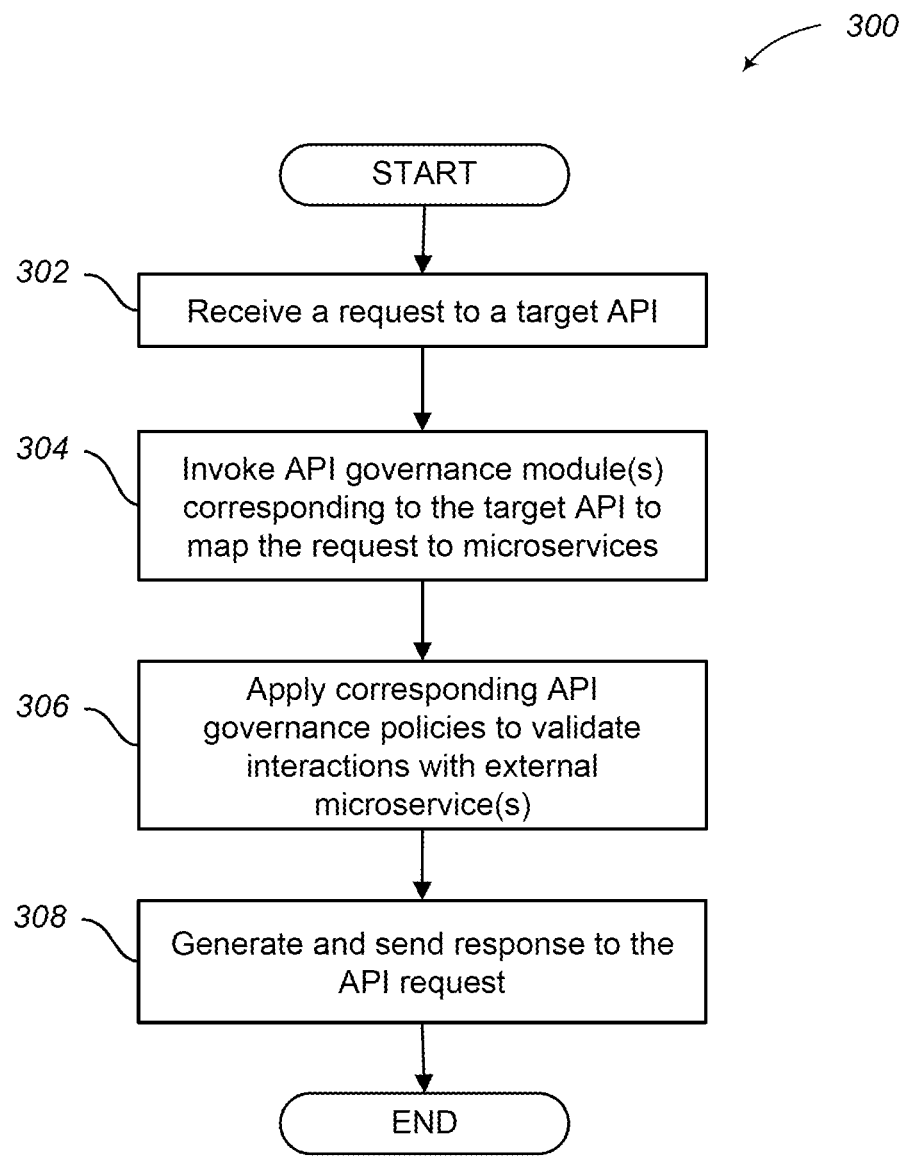
FIG. 3 is a flow diagram depicting an example process for managing an API request in accordance with some embodiments of the techniques described herein.

FIG. 3 is a flow diagram depicting an example process 300 for managing an API request in accordance with some embodiments of the techniques described herein. In various embodiments, the process 300 is performed in real time (e.g., relative to the API request being made), and at least some part of the process 300 is performed in a transparent manner to a requesting system or device (e.g., a user device) that makes the API request. Illustratively, at least some part of the process 300 can be implemented by the network API platform 102 and API governance module(s) 203.

The process 300 starts at block 302, which includes receiving a request to a target API. The request can be an API call from a user device, a component of network core of the communications network (e.g., the 5G communications network), or an internal or external microservice. The request can be received at the network API platform 102, which can implement multiple API endpoints to expose different APIs corresponding to different functionalities.

At block 304, the process 300 includes invoking a combination of API governance modules corresponding to the target API to map the request to a combination of microservices. Each distinct API exposed by the network API platform can correspond to distinct combination of API governance modules and map to a distinct combination of microservices. Each distinct combination of API governance modules can be selected from a collection or repository of API governance modules implemented remotely from the API platform, without being accessible to the API requesting device. Each distinct combination of microservices can include one or more internal microservices maintained within the communications network and one or more external microservices maintained externally to the communications network. The mapping between an exposed API and its combination of microservices can be performed through API proxy, API gateway, or other applicable techniques.

Some invoked API governance module(s) can indicate the particular combination of microservices that the target API maps to and/or a manner in which the mapping is performed. The mapping to at least a subset of the combination of microservices can be temporally sequential (e.g., interacting with the microservices one after another), temporally concurrent (e.g., interacting with the microservices at the same time), temporally partially overlapping (e.g., staggered interactions with microservices), or logically recursive. The logically recursive manner can include receiving another request to another target API exposed by the network API platform, from one or more microservices within the subset of microservices; the network API platform can then invoke another combination of API governance modules corresponding to the other target API to map the other request to another combination of microservices, which may or may not overlap with the subset of microservices. Such recursive interaction(s) with microservice(s) can retrieve intermediate data from internal or external microservice(s), which can then be fed into other internal or external microservice(s) in accordance with the mapping of the target API.

At block 306, the process 300 includes applying corresponding API governance policies to validate interactions with external microservice(s) included in the combination of microservices. Some API governance module(s) are invoked before, during, or after interaction with the external microservice(s), and the API governance module(s) can indicate API governance policies to validate the interactions with the external microservice(s) based on the parameters, configurations, or other contextual data of the request. The validation can include validating data quality, data registration, response time, version of the microservice(s), whether the microservice(s) satisfy a service level agreement, combination of the same or the like. In some embodiments, blocks 304 and 306 can be performed multiple times in accordance with the mapping of the target API.

At block 308, the process 300 includes generating and sending a response to the request. Illustratively, the response is sent to the user device, component of network core of the communications network, or an internal or external microservice that made the call to the target API. The response can be generated based on the interactions with the particular combination of microservices to which the request is mapped. The intermediate data retrieved from at least some microservices and fed into other microservice(s) may or may not be part of the response to the request.

The various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
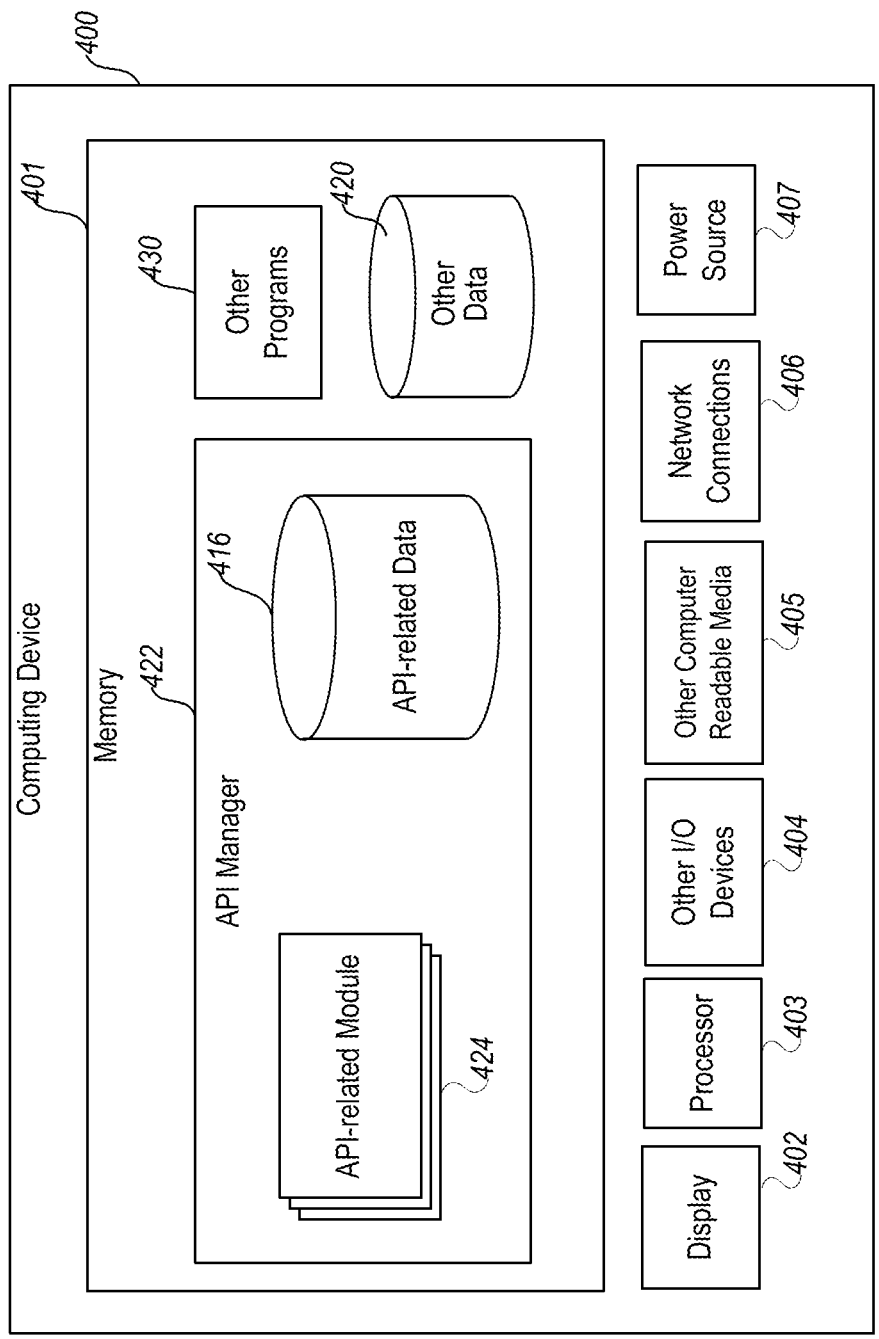
FIG. 4 is a block diagram illustrating elements of an example computing system or device utilized in accordance with some embodiments of the techniques described herein.

FIG. 4 is a block diagram illustrating elements of an example computing system or device 400 utilized in accordance with some embodiments of the techniques described herein. Illustratively, the computing device 400 corresponds to a network API platform 102, a system or device implementing API governance module(s) 203, an element or component of communication connections 110, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the API manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The API manager 422 is shown residing in memory 401. In other embodiments, some portion of the contents and some, or all, of the components of the API manager 422 may be stored on and/or transmitted over the other computer-readable media 405. The components of the computing device 400 and API manager 422 can execute on one or more processors 403 and implement applicable functions described herein. In some embodiments, the API manager 422 may operate as, be part of, or work in conjunction and/or cooperation with other software applications stored in memory 401 or on various other computing devices. In some embodiments, the API manager 422 also facilitates communication with peripheral devices via the I/O devices 404, or with another device or system via the network connections 406.

The one or more API-related modules 424 is configured to perform actions related, directly or indirectly, to API and microservices management as described herein. In some embodiments, the API-related modules 424 include API governance module(s) 203. In some embodiments, the API-related module(s) 424 stores, retrieves, or otherwise accesses at least some API-related data on some portion of the API-related data storage 416 or other data storage internal or external to the computing device 400. In various embodiments, at least some of the API-related modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and API manager 422 include API(s) that provides programmatic access to add, remove, or change one or more functions of the computing device 400. In some embodiments, components/modules of the computing device 400 and API manager 422 are implemented using standard programming techniques. For example, the API manager 422 may be implemented as an executable running on the processor(s) 403, along with one or more static or dynamic libraries. In other embodiments, the computing device 400 and API manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the API manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by an API manager 422 implementation. Also, other functions could be implemented and/or performed by each component/module, and in different orders, and by different components/modules, yet still achieve the functions of the computing device 400 and API manager 422.

In addition, programming interfaces to the data stored as part of the computing device 400 and API manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The API-related data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the API manager 422.

Furthermore, in some embodiments, some or all of the components of the computing device 400 and API manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for facilitating application programming interfaces (APIs) to microservices associated with a 5G communications network, the method comprising:
    receiving, at an API platform, a request to a target API of a plurality of APIs exposed by the API platform;
    invoking, by the API platform, a combination of API governance modules corresponding to the target API and selected from a plurality of API governance modules implemented remotely from the API platform, to map the request to a plurality of microservices, wherein the plurality of microservices includes one or more internal microservices maintained within the 5G communications network and one or more external microservices maintained externally to the 5G communications network;
    applying, by the API platform, API governance policies indicated by at least a subset of the combination of API governance modules to validate interactions with the one or more external microservices based, at least in part, on the request; and
    generating and sending a response to the request based, at least in part, on the interactions with the one or more external microservices.

2. The method of claim 1, wherein the request to the target API is sent from a requesting device and the invoking of the combination of API governance modules is transparent to the requesting device.

3. The method of claim 1, wherein invoking the combination of API governance modules to map the request to the plurality of microservices comprises mapping the request, at least in part, to a subset of the plurality of microservices, wherein the mapping indicates that the subset of the plurality of microservices are interacted with in a temporally sequential manner.

4. The method of claim 1, wherein invoking the combination of API governance modules to map the request to the plurality of microservices comprises mapping the request, at least in part, to a subset of the plurality of microservices, wherein the mapping indicates that the subset of the plurality of microservices are interacted with in a temporally concurrent manner.

5. The method of claim 1, wherein invoking the combination of API governance modules to map the request to the plurality of microservices comprises mapping the request, at least in part, to a subset of the plurality of microservices, wherein the mapping indicates that the subset of the plurality of microservices are interacted with in a logically recursive manner.

6. The method of claim 5, wherein mapping the request, at least in part, to a subset of the plurality of microservices comprises:
    receiving, at the API platform and from a microservice of the subset, another request to another target API of the plurality of APIs exposed by the API platform;
    invoking, by the API platform, another combination of API governance modules corresponding to the other target API and selected from the plurality of API governance modules implemented remotely from the API platform, to map the other request to one or more microservices of the subset; and
    generating and sending a response to the other request based, at least in part, on interactions with the one or more microservices of the subset.

7. The method of claim 1, wherein applying the API governance policies indicated by at least a subset of the combination of API governance modules to validate interactions with the one or more external microservices comprises validating at least one of data quality, data registration, response time, or version of the one or more external microservices.

8. The method of claim 7, wherein the at least one of data quality, data registration, response time, or version of the one or more external microservices is specified by a service level agreement.

9. An API facilitation system for a communications network, comprising:
    memory that stores computer executable instructions; and
    one or more processors that individually or collectively execute the computer executable instructions to cause actions to be performed, the actions comprising:
        receiving, at an API platform, a request to a target API of a plurality of APIs exposed by the API platform;
        invoking, by the API platform, a combination of API governance modules corresponding to the target API and selected from a plurality of API governance modules implemented remotely from the API platform, to map the request to a plurality of microservices, wherein the plurality of microservices includes one or more internal microservices maintained within the communications network and one or more external microservices maintained externally to the communications network;
        applying, by the API platform, API governance policies indicated by at least a subset of the combination of API governance modules to validate interactions with the one or more external microservices based, at least in part, on the request; and
        generating and sending a response to the request based, at least in part, on the interactions with the one or more external microservices.

10. The system of claim 9, wherein the request to the target API is sent from a requesting device and the applying of the API governance policies is transparent to the requesting device.

11. The system of claim 9, wherein invoking the combination of API governance modules to map the request to the plurality of microservices comprises mapping the request, at least in part, to a subset of the plurality of microservices, wherein the mapping indicates that the subset of the plurality of microservices are interacted with in at least one of a temporally sequential manner, temporally concurrent manner, or temporally partially overlapping manner.

12. The system of claim 9, wherein invoking the combination of API governance modules to map the request to the plurality of microservices comprises mapping the request, at least in part, to a subset of the plurality of microservices, wherein the mapping indicates that the subset of the plurality of microservices are interacted with in a logically recursive manner.

13. The system of claim 12, wherein mapping the request, at least in part, to a subset of the plurality of microservices comprises:
   receiving, at the API platform and from a microservice of the subset, another request to another target API of the plurality of APIs exposed by the API platform;
   invoking, by the API platform, at least one other API governance module corresponding to the other target API and selected from the plurality of API governance modules implemented remotely from the API platform, to map the other request, at least in part, to one or more microservices of the subset; and
   generating and sending a response to the other request based, at least in part, on interactions with the one or more microservices of the subset.

14. The system of claim 9, wherein the interactions with at least one of the one or more external microservices comprises retrieving intermediate data from the at least one of the one or more external microservices, wherein the intermediate data is at least a portion of input into at least one of the one or more internal microservices.

15. The system of claim 9, wherein applying the API governance policies indicated by at least a subset of the combination of API governance modules to validate interactions with the one or more external microservices comprises validating at least one of data quality, data registration, response time, or version of the one or more external microservices.

16. One or more non-transitory computer-readable media collectively storing contents that, when executed by one or more processors, cause the one or more processors, individually or collectively, to perform actions comprising:
   receiving, at an API platform, a request to a target API of a plurality of APIs exposed by the API platform;
   invoking, by the API platform, a combination of API governance modules corresponding to the target API and selected from a plurality of API governance modules implemented remotely from the API platform, to map the request to a plurality of microservices, wherein the plurality of microservices includes one or more internal microservices maintained within the communications network and one or more external microservices maintained externally to the communications network;
   applying, by the API platform, API governance policies indicated by at least a subset of the combination of API governance modules to validate interactions with the one or more external microservices based, at least in part, on the request; and
   generating and sending a response to the request based, at least in part, on the interactions with the one or more external microservices.

17. The one or more non-transitory computer-readable media of claim 16, wherein invoking the combination of API governance modules to map the request to the plurality of microservices comprises mapping the request, at least in part, to a subset of the plurality of microservices, wherein the mapping indicates that the subset of the plurality of microservices are interacted with in at least one of a temporally sequential manner, temporally concurrent manner, or temporally partially overlapping manner.

18. The one or more non-transitory computer-readable media of claim 16, wherein invoking the combination of API governance modules to map the request to the plurality of microservices comprises mapping the request, at least in part, to a subset of the plurality of microservices, wherein the mapping indicates that the subset of the plurality of microservices are interacted with in a logically recursive manner.

19. The one or more non-transitory computer-readable media of claim 18, wherein mapping the request, at least in part, to a subset of the plurality of microservices comprises:
   receiving, at the API platform and from a microservice of the subset, another request to another target API of the plurality of APIs exposed by the API platform;
   invoking, by the API platform, at least one other API governance module corresponding to the other target API and selected from the plurality of API governance modules implemented remotely from the API platform, to map the other request, at least in part, to one or more microservices of the subset; and
   generating and sending a response to the other request based, at least in part, on interactions with the one or more microservices of the subset.

20. The one or more non-transitory computer-readable media of claim 16, wherein the interactions with at least one of the one or more external microservices comprises retrieving intermediate data from the at least one of the one or more external microservices, wherein the intermediate data is at least a portion of input into at least one of the one or more internal microservices.

* * * * *